US00H002267H

(19) United States
(12) Statutory Invention Registration
Nelson, Jr.

(10) Reg. No.: US H2267 H
(43) Published: Mar. 6, 2012

(54) METHOD AND APPARATUS FOR BLENDING FUEL COMPONENTS

(75) Inventor: Robert Edward Nelson, Jr., The Woodlands, TX (US)

(73) Assignee: Shell Oil Company, Houston, TX (US)

(21) Appl. No.: 12/423,864

(22) Filed: Apr. 15, 2009

(51) Int. Cl.
*C10L 1/18* (2006.01)
*B01J 19/00* (2006.01)

(52) U.S. Cl. ..... 44/451; 422/105

(58) Field of Classification Search ..... 44/451; 422/105, 68.1; 366/4; 700/239, 272; 73/64.44, 73/64.45

See application file for complete search history.

(56) References Cited

U.S. PATENT DOCUMENTS 5,179,926 A * 1/1993 Ament ..... 73/61.43
6,258,987 B1 * 7/2001 Schmidt et al. ..... 44/457
6,588,253 B2 * 7/2003 Lambert et al. ..... 73/53.01
6,679,302 B1 * 1/2004 Mattingly et al. ..... 141/104
6,880,392 B2 * 4/2005 Lee et al. ..... 73/114.38
2003/0033959 A1 * 2/2003 Morita et al. ..... 106/31.28
2003/0213293 A1 * 11/2003 Lee et al. ..... 73/118.1
2005/0143609 A1 * 6/2005 Wolf et al. ..... 585/14
2007/0256354 A1 * 11/2007 Gibbs ..... 44/451
2008/0086933 A1 * 4/2008 Cunningham et al. ..... 44/451
2010/0175313 A1 * 7/2010 Mattingly et al. ..... 44/451
2010/0263266 A1 * 10/2010 Nelson, Jr. ..... 44/451

* cited by examiner

*Primary Examiner*—Daniel Pihulic

(57) ABSTRACT

A method and apparatus involve: determining a specification for a fuel volatility characteristic so that a fuel complying with the specification meets an applicable regulatory requirement for volatility with or without the addition of ethanol; and utilizing a fuel blending mechanism to blend a plurality of different fuel components in a manner meeting the specification. A different aspect involves a computer-readable medium storing a computer program that, when executed: determines a specification for a fuel volatility characteristic so that a fuel complying with the specification meets an applicable regulatory requirement for volatility with or without the addition of ethanol; and causes a fuel blending mechanism to blend a plurality of different fuel components in a manner meeting the specification.

4 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

| VOLATILITY GRADE | ASTM VOLATILITY CLASS FOR FLORIDA | RVP MAX | T50 | T-V/L MIN |
|---|---|---|---|---|
| 1 | AA-3 | 7.8 | ~~170~~ **205** TO 250 | ~~124~~ **139** |
| 2 | A-3 | 9.0 | ~~170~~ **205** TO 250 | ~~124~~ **139** |
| 3 | C-3 | ~~11.5~~ **10.5** | ~~170~~ **205** TO 240 | ~~124~~ **139** |
| 4 | D-4 | ~~13.5~~ **12.5** | ~~150~~ **185** TO 235 | ~~116~~ **128** |

METHOD AND APPARATUS FOR BLENDING FUEL COMPONENTS

FIELD OF THE INVENTION

This invention relates in general to techniques for blending fuel components and, more particularly, to techniques for blending fuel components so as to meet regulatory requirements, such as regulatory requirements for gasoline with or without ethanol.

BACKGROUND OF THE INVENTION

One characteristic of gasoline is that it has a relatively high volatility. Government entities issue regulations that specify maximum and/or minimum permissible levels or volatility. As one aspect of compliance with such regulations, it is well known that adding ethanol to gasoline will yield a mixture having different volatility and octane properties than the gasoline alone.

For example, in regard to volatility, adding ethanol to gasoline (1) increases what is commonly known as the Reid vapor pressure (RVP), (2) decreases what is commonly known as the vapor-liquid ratio temperature (T-V/L), and (3) decreases what is commonly known as the distillation temperature at the volume percent evaporated distillation point (T50). Thus, if an ethanol-free gasoline meets applicable regulatory requirements, but ethanol is then added and changes the volatility and octane properties, the resulting mixture may no longer comply with those regulatory requirements. As a result, refineries have traditionally prepared and distributed both (1) ethanol-free gasoline, and (2) a different gasoline blend that is configured to be mixed with ethanol but does not meet regulatory requirements until mixed with ethanol. While this approach has been generally adequate for its intended purposes, it has not been entirely satisfactory in all respects.

For example, in the distribution channel from the refinery to the ultimate consumer, it is necessary to transport, handle and store multiple grades of gasoline in order to service a market that desires or requires both ethanol-free gasoline and a gasoline-ethanol blend. In the event of an ethanol shortage at a distribution terminal carrying only gasoline formulated to be mixed with ethanol, the ethanol shortage would prevent the distribution terminal from conducting any sales of the gasoline in its inventory.

BRIEF DESCRIPTION OF THE DRAWINGS

A better understanding of the present invention will be realized from the detailed description that follows, taken in conjunction with the accompanying drawings, in which.

DETAILED DESCRIPTION OF THE INVENTION

Figure 1:
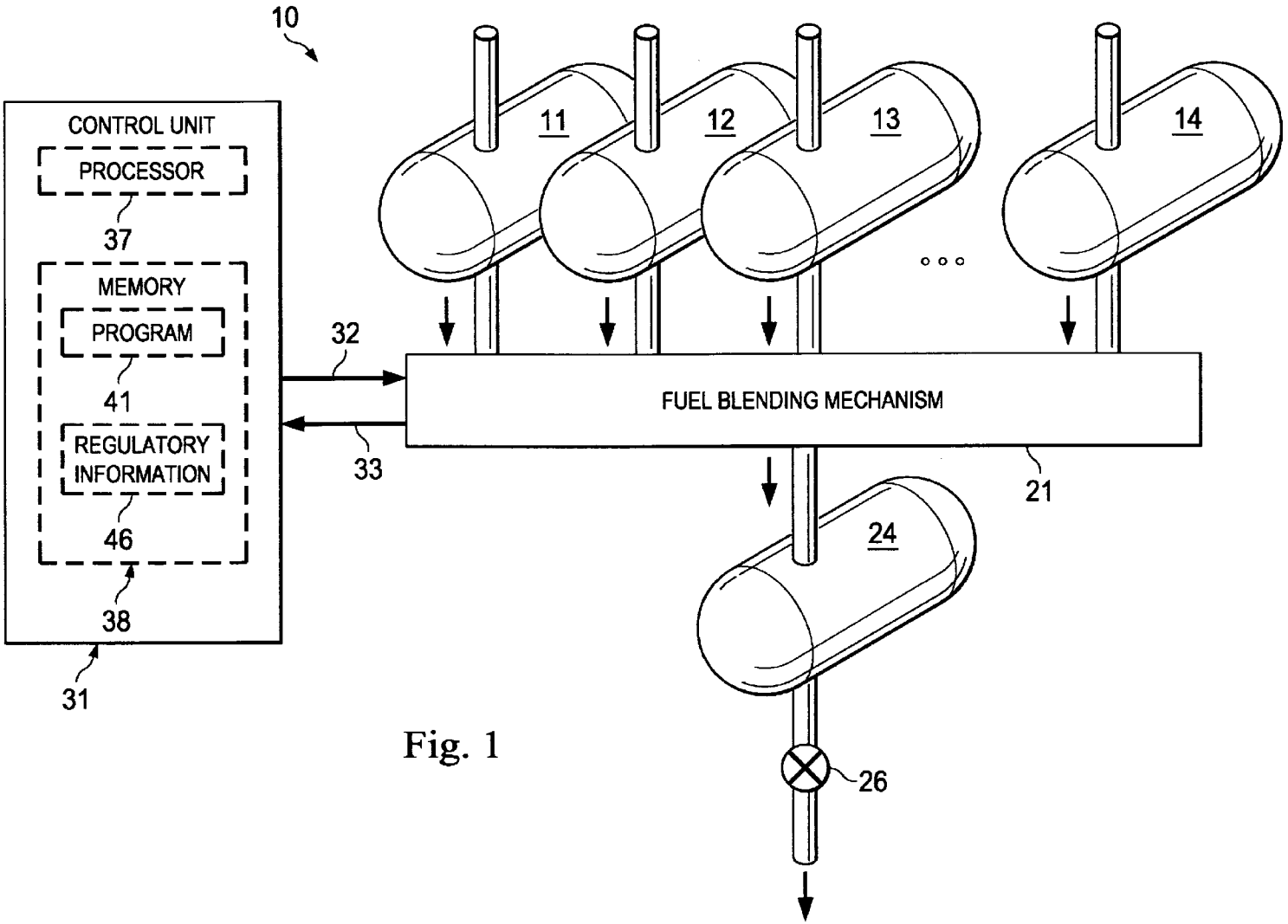
FIG. 1 is a block diagram of a fuel blending apparatus that embodies aspects of the invention.

FIG. 1 is a block diagram of a fuel blending apparatus that embodies aspects of the invention. In the disclosed embodiment, the fuel blending apparatus 10 is used to produce gasoline, and would typically be located at an oil refinery. However, the apparatus 10 could alternatively be used for other purposes.

The fuel blending apparatus 10 includes a plurality of fuel component storage tanks, four of which are shown in FIG. 1 at 11-14. The tanks 11-14 each store a quantity of a respective different fuel component, and some or all of these components can be mixed in appropriate proportions in order to yield a desired formulation or grade of gasoline. The storage tanks 11-14 contain respective different fuel components that are all well known in the art, and the individual fuel components are therefore not described here in detail.

The fuel blending apparatus 10 includes a fuel blending mechanism 21 that is in fluid communication through respective conduits with each of the storage tanks 11-14. The fuel blending mechanism 21 is a configuration of a type that is very well known in the art, and it is therefore not illustrated and described here in detail. The fuel blending mechanism 21 may include conduits, valves, pumps, mixers and/or sensors.

The fuel blending mechanism 21 can combine selected fuel components from some or all of the storage tanks 11-14 in selected proportions, in order to produce gasoline having a specific desired formulation. The resulting blend of fuel components, or in other words the resulting gasoline, is then supplied through a further conduit to a gasoline storage tank 24 that is a part of the apparatus 10. Gasoline in the storage tank 24 can be selectively withdrawn through an outlet conduit having a valve 26. For example, gasoline from the tank 24 can flow through the outlet conduit and valve 26 into a not-illustrated pipeline that will carry the gasoline to a destination such as a distribution terminal. Alternatively, gasoline from the tank 24 can flow through the conduit and valve 26 into a not-illustrated tanker truck that will transport the gasoline to a destination such as a distribution terminal The apparatus 10 also includes an electronic control unit 31 for generating control signals 32 that control the fuel blending mechanism 21. In the disclosed embodiment, the control unit 31 also receives feedback signals 33 from the fuel blending mechanism 21. The feedback signals 33 may, for example, include the outputs of sensors that are present within the fuel blending mechanism 21, and that measure one or more parameters of interest.

In the disclosed embodiment, the hardware of the control unit 31 is implemented with a conventional and commercially-available computer system. As one example, the hardware of the control unit 31 can be a standard personal computer obtained commercially from Dell, Inc. of Round Rock, Tex. Alternatively, however, the control unit 31 could be implemented using any other suitable hardware. In the disclosed embodiment, the computer hardware in the control unit 31 includes a processor 37, which may be any suitable processor or microprocessor. As one example, the processor 37 may be a device that is available commercially under the tradename CORE™ 2 Duo from Intel Corporation of Santa Clara, Calif.

The computer hardware of the control unit 31 includes a memory 38 that is shown diagrammatically in FIG. 1, and that collectively represents several different types of memory that happen to be present within the computer. For example, the memory 38 may include any or all of a hard disk drive (HDD), a volatile random access memory (RAM), a "flash" RAM, a read-only memory (ROM), or any other type of memory component suitable for use within the computer hardware of the control unit 31. The memory 38 stores various programs and data, only some of which are illustrated in FIG. 1. As one example, the memory 38 stores a computer program 41 that is executed by the processor 37. As another example, the memory 38 stores data, including regulatory information 46 that is discussed later.

Before explaining some of the operational aspects of the control unit 31, it will be helpful to provide a short discussion of some fundamental considerations involved In the manufacture of gasoline. Gasoline, also known as "petrol", is a petroleum-derived liquid mixture, and is used primarily as fuel for internal combustion engines. It contains mostly aliphatic hydrocarbons, enhanced with iso-octane, or the aromatic hydrocarbons toluene and benzene in order to increase its octane rating. Small quantities of various additives are also common, for purposes such as tuning performance, reducing engine wear, reducing engine deposits, and reducing emissions. (Most or all of these additives would typically be added at a distribution terminal, rather than by the fuel blending apparatus shown at 10 in FIG. 1).

One significant characteristic of gasoline is its volatility. Gasoline is more volatile than many other fuels, such as diesel oil and kerosene. This relatively high volatility is due primarily to the nature of the base constituents, but can also be affected by additives that are put into the gasoline.

The volatility of gasoline varies with ambient temperature. In hot climates, excessive volatility can cause gasoline to change from a liquid state to a gaseous state within a fuel line of a vehicle, thereby rendering the fuel pump ineffective and thus starving the engine of fuel. This condition is commonly referred to as "vapor lock". On the other hand, in cold climates, low volatility can cause the gasoline to fail to produce enough vapor to allow a cold engine to start. In view of these temperature considerations, gasoline intended for use in a hot climate can be blended so that a greater proportion of the fuel components have higher molecular weights, and thus lower volatility. Conversely, gasoline intended for use in cold climates can be blended so that a greater proportion of the fuel components have lower molecular weights, and thus higher volatility. The degree of volatility of gasoline can also involve environmental considerations. As one example, the degree of volatility can influence the combustion of gasoline in an engine, thereby affecting the level of unburned hydrocarbons present in the exhaust gases of the engine.

The degree of volatility of a given formulation or grade of gasoline can be controlled through appropriate selection of fuel components and their relative proportions, because different fuel components have respective different levels of volatility. Of course, the components also have other physical properties that need to be taken into account, along with intangible considerations such as respective different production costs. As a result, the blending process involves balancing of a number of different properties and considerations, one of which is the volatility of the overall mixture.

Various different tests have been developed to quantify the degree of volatility of gasoline. In the United States, the most common tests for volatility have been promulgated and standardized by ASTM International of West Conshohocken, Pa. (originally known as the American Society for Testing and Materials, or "ASTM"). For example, ASTM International Designation D4814-07b is entitled "Standard Specification for Automotive Spark-Ignition Engine Fuel", and defines some common tests for volatility. One such test is the Reid Vapor Pressure (RVP) test. Another is the distillation temperature at the fifty volume percent evaporated distillation point (T50). Still another is the vapor-liquid ratio temperature (T-V/L) test. These tests are industry standards that are very well known in the art, and they are therefore not described in detail here.

In many countries and regions, the volatility of gasoline is subject to government regulation, for example for the purpose of reducing the volume of unburned hydrocarbons emitted in large urban areas. In most regions of the United States, the volatility of gasoline is subject to state regulations and also federal regulations. Moreover, the level of volatility permitted under both state and federal regulations will often vary during the course of a year, in order to accommodate seasonal variations in temperature that affect volatility in the manner discussed above. In regard to volatility, government regulations often specify minimum and/or maximum values for one or more volatility tests such as the RVP, T50 and/or T-V/L tests.

In recent years, as an alternative to standard gasoline, it has become common to offer a mixture of gasoline and ethanol. The mixture typically includes 9% to 10% of ethanol by volume, although there are some less common fuels that contain higher or lower amounts of ethanol. Government regulations often require or encourage the addition of up to 10 volume percent ethanol. When ethanol is mixed with gasoline, the volatility of the resulting mixture is higher than that of the gasoline alone. Where prevailing government regulations for gasoline (e.g. state regulations) do not allow for the increase in volatility that results from the addition of ethanol, manufacturers have formulated two separate blends of gasoline that are respectively intended to be sold with and without the addition of ethanol.

This has presented some practical problems. For example, where a refinery provides gasoline to a distribution terminal through a pipeline, the pipeline can contain only one of the two different blends of gasoline at any particular point in time. This presents logistical issues as to how to efficiently transport two different blends of gasoline from the refinery to one or more distribution terminals. Further, if a distribution terminal wishes to offer both blends of gasoline at its truck racks, the distribution terminal would need to dedicate some storage tanks to one blend and other storage tanks to the other blend. However, many existing distribution terminals were built with only a limited number of storage tanks, and do not have enough tanks to efficiently handle both blends of gasoline.

In view of these practical considerations, a distribution terminal might elect to sell only the gasoline blend configured for sale without ethanol, or only the gasoline blend configured to be mixed with ethanol. In the event that a distribution terminal elected to carry only the gasoline blend configured to be mixed with ethanol, a shortage in the supply of ethanol could have a significantly adverse effect on the ability of that distribution terminal to sell its inventory of gasoline and service its customers.

To address these issues, one aspect of the present invention is the provision of a single gasoline blend that can be sold either with or without ethanol, and that will meet all pertinent regulatory requirements when sold in either form. A specific example will be given below to demonstrate how this result can be achieved. This example happens to relate to Florida, and reflects state and federal regulations that were in effect for Florida at a particular point in time. However, it should be understood that the government regulations applicable to any particular region can differ from those in other regions, and can change over time. Consequently, the following discussion of specific regulations applicable to Florida is exemplary, and merely demonstrates how the principles of the invention can be applied to one exemplary set of government regulations. The principles can be applied in a similar manner to government regulations in other regions.

Figures 2, 3:
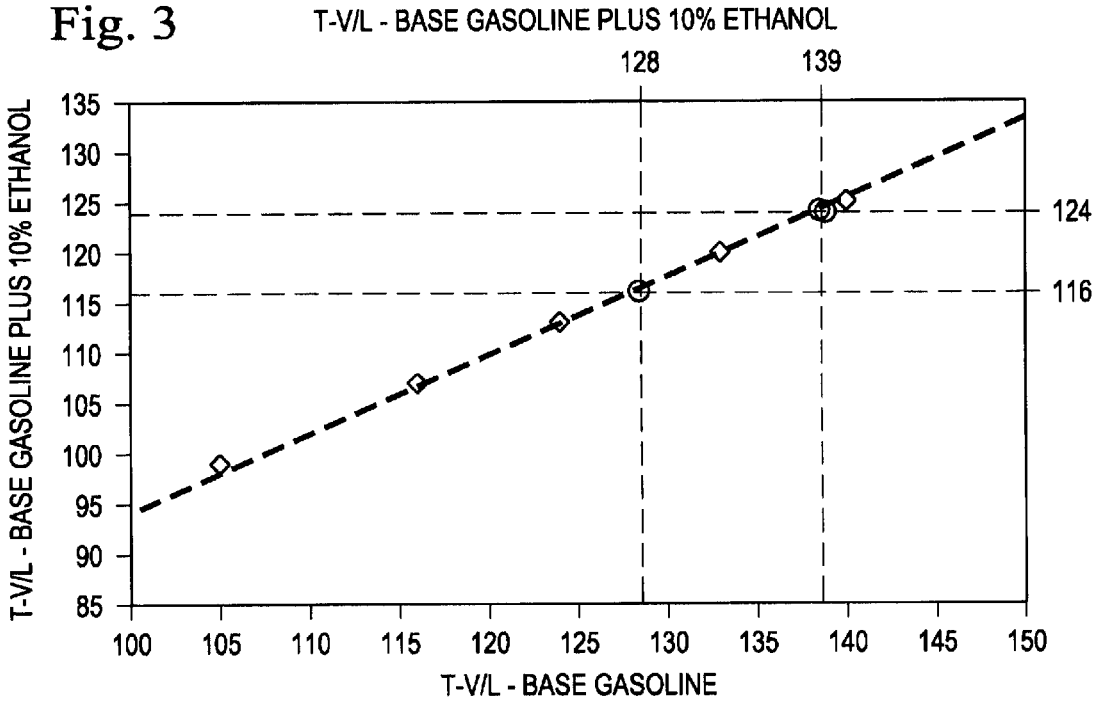
FIG. 2 is a table that lists four different grades of gasoline, and that sets forth exemplary regulatory values and some adjustments thereto for each of three different volatility-measurement techniques.
FIG. 3 is a graph that shows, for a given volatility-measurement technique, an empirically-determined relationship between the measured volatility of gasoline alone, and the measured volatility of a gasoline-ethanol mixture.

Some different tests for specifying volatility characteristics were mentioned above, and include the RVP, T50 and T-V/L tests. FIG. 2 is a table that lists four different grades of gasoline, and that sets forth regulatory values and some adjustments thereto for each of RVP, T50 and T-V/L. The regulatory values in the table applied in Florida at a specific point in time, and represent part of the regulatory information stored at 46 in the memory 38 (FIG. 1). The regulatory values in the table do not represent all of the government regulations that apply to gasoline, but instead represent a subset of applicable regulations that are pertinent to and facilitate an understanding of the present invention. The regulatory values in the table reflect a combination of state and federal regulations that were in effect for Florida at a particular point in time. Each regulatory value in the table is the stricter of the applicable state regulation or federal regulation. In addition, each regulatory value in the table applies to gasoline with or without ethanol, except as otherwise indicated below.

Each row of the table represents a respective different volatility grade of gasoline. Grades 1 and 2 (the top two rows) are volatility grades intended for use in Florida during hot summer weather. Grades 2 and 3 are intended for use in Florida during the moderate weather of spring and fall, and grade 4 is intended for use in Florida during cooler winter weather.

In FIG. 2, the center column of the table relates to maximum permissible values for RVP. Taking into account all relevant government regulations, the maximum value permitted for RVP is 7.8 psia (pounds per square inch absolute) for grade 1, 9.0 psia for grade 2, 11.5 psia for grade 3, and 13.5 psia for grade 4. In general, adding 9% to 10% ethanol by volume to gasoline will increase the RVP value by up to about 1.0 psia. Therefore, in the table of FIG. 2, the maximum permissible RVP values given by government regulations for grades 3-4 have each been separately adjusted to an even stricter value than that required by government regulations. In particular, 1.0 psia has been subtracted from each regulatory value. Thus, the regulatory value of 11.5 psia for grade 3 has been reduced to 10.5 psia, and the regulatory value of 13.5 psia for grade 4 has been reduced to 12.5 psia. This ensures that, if up to 10% ethanol by volume is added to gasoline meeting the adjusted RVP specification 20 for any of grades 3-4, the actual RVP of the mixture may be up to 1.0 psia higher than the RVP of the gasoline alone, but will still be less than the maximum RVP value specified by regulation for that grade.

As one specific example, assume that some gasoline in grade 3 meets the adjusted specification, because it has a measured RVP value of 10.5 psia (or less). This RVP value is necessarily below and therefore also satisfies the maximum regulatory value of 11.5 psia. If that same gasoline is mixed with ethanol, in a manner so that the mixture includes 10% ethanol by volume, the measured RVP of the mixture will be higher than that for the gasoline alone, and may for example be 11.5 psia, but will still not exceed and will therefore satisfy the maximum regulatory value of 11.5 psia.

As to grades 1 and 2, the government regulations reflected in the table happen to include a summertime federal exception or waiver for increases in RVP that result from the addition of 9% to 10% ethanol by volume. In other words, as to grade 1, the maximum permissible RVP value for gasoline without ethanol is specified by federal government regulation to be 7.8 psia. If gasoline of grade 1 has a measured RVP of 7.8 psia, and then up to 10% ethanol by volume is added, the RVP of the mixture may increase by up to 1.0 psia (or in other words up to a value of 8.8 psia). This exceeds the regulatory maximum value of 7.8 psia, but the regulatory waiver excuses this non-compliance. Similarly, as to grade 2, if gasoline of grade 2 has an RVP less than the regulatory maximum of 9.0 psia, and then up to 10% ethanol by volume is added, the RVP of the mixture may increase by up to 1.0 psia (or in other words up to a value of 10.0 psia). This exceeds the regulatory maximum of 9.0 psia, but the regulatory waiver permits this increase. Thus, as to grades 1 and 2, it is not necessary to adjust the regulatory value, due to the regulatory waiver provided for each of these grades.

In the table of FIG. 2, the second column from the right relates to permissible ranges under government regulation for distillation temperature at the fifty volume percent evaporated distillation point (T50). The values shown are in degrees Fahrenheit. Taking into account all relevant government regulations, the ranges of T50 permitted by regulation are 170° F. to 250° F. for each of grades 1 and 2, 170° F. to 240° F. for grade 3, and 150° F. to 235° F. for grade 4. When gasoline is mixed with 9% to 10% ethanol by volume, the measured value for T50 will typically decrease by about 35° F. Consequently, in the T50 column in the table of FIG. 2, each of the minimum permissible temperatures for T50 has been adjusted, and in particular has been increased by 35° F. More specifically, for each of grades 1-3 the minimum temperature of the range has been increased from 170° F. to 205° F., and for grade 4 the minimum temperature of the range has been increased from 150° F. to 185° F.

If gasoline is formulated to meet the adjusted T50 temperature range for any grade, then even when ethanol is added, the mixture will still meet the permissible range specified by regulation for that grade. Stated differently, if gasoline is formulated to satisfy the adjusted temperature range for any grade, then it will meet the regulatory temperature range for that grade either with or without ethanol. As one example, if gasoline in grade 3 meets the adjusted specification because it has a measured T50 value between 205° F. and 240° F., then the T50 value is also necessarily within and satisfies the regulatory range of 170° F. to 240° F. If that same gasoline is mixed with ethanol, in a manner so that the mixture includes 10% ethanol by volume, the measured T50 of the mixture may be lower by a differential of about 35° F. In other words it will be in a range of 170° F. to 205° F., but in that case it is also within and satisfies the regulatory range of 170° F. to 240° F.

In the table of FIG. 2, and taking Into account all relevant government regulations, the right column of the table shows the minimum permissible values for the vapor-liquid ratio temperature (T-V/L). When ethanol is mixed with gasoline, the measured T-V/L for the mixture will be lower than the measured T-V/L for the gasoline alone. In this regard, FIG. 3 is a graph in which the slanted broken line represents an empirically-determined relationship between T-V/L for gasoline alone (horizontal axis), and T-V/L for gasoline mixed with 10% ethanol by volume (vertical axis) The horizontal solid lines at T-V/L values of 116° F. and 124° F. on the vertical axis identify the minimum values of T-V/L permitted by government regulation for respective different grades. The intersections of each of these lines with the slanted broken line identify the adjusted T-V/L values of 128° F. and 139° F. (on the horizontal axis) that are needed so that the gasoline alone and also the gasoline-ethanol mixture will both satisfy the applicable regulations for each grade of gasoline.

In particular, as shown in the right column of the table in FIG. 2, the regulatory value of 124° F. for each of grades of 1, 2 and 3 has been adjusted to 139° F., and the regulatory value of 116° F. for grade 4 has been adjusted to 128° F. If gasoline is formulated to meet the adjusted T-V/L value for any grade, then even when ethanol is added, the mixture will still meet the regulatory requirement for T-V/L for that grade. As one example, if gasoline in grade 3 meets the adjusted specification because it has a measured T-V/L value at or above 139° F., then it is also necessarily above the regulatory minimum of 124° F. If that same gasoline is then mixed with ethanol, in a manner so that the mixture includes 10% ethanol by volume, the measured T-V/L of the mixture may be lower by a differential of up to about 15° F., but it will still be above the regulatory minimum of 124° F. Stated differently, this gasoline in grade 3 will be at or above the regulatory T-V/L minimum, regardless of whether the gasoline is sold with or without ethanol. The same is also true for each of the other grades in the table of FIG. 2.

Referring again to FIG. 1, and as discussed earlier, a balancing process is involved in determining an appropriate blend of fuel components from tanks 11-14 that will meet a number of different specifications and requirements (including those set forth in FIG. 2). In this regard, the computer program 41 takes all of the relevant specifications and considerations, including relevant information from the table of FIG. 2, and then uses known techniques to formulate a suitable blend of fuel components in appropriate proportions that will yield gasoline meeting all relevant specifications. In this regard, FIG. 4 is a high-level flowchart showing a sequence of activity carried out by the program 41.

Figure 4:
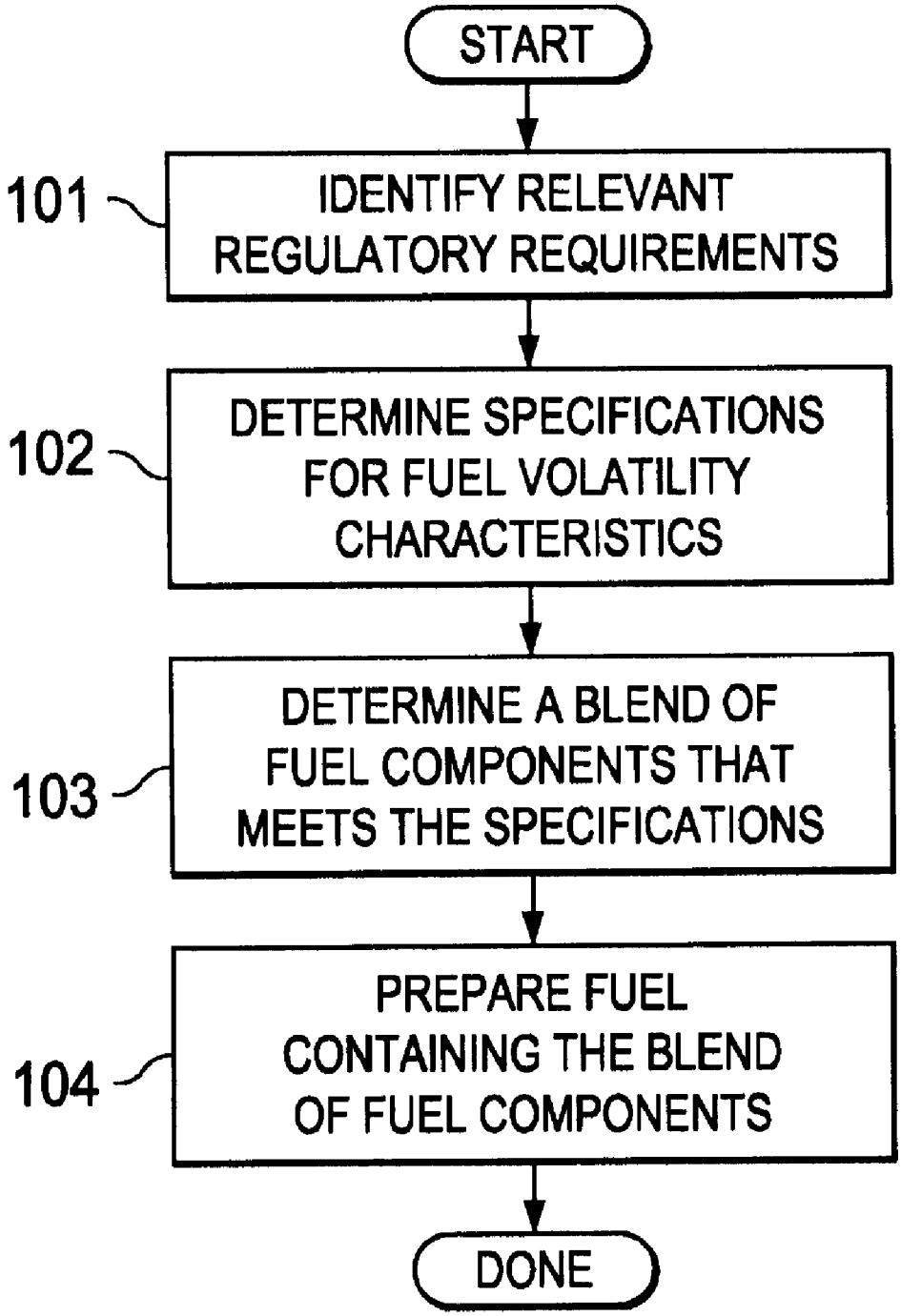
FIG. 4 is a high-level flowchart showing a sequence of activity carried out by a computer program executed by a computer in the apparatus of FIG. 1.

In block 101 of FIG. 4, the program 41 identifies relevant regulatory requirements. For example, if the control unit 31 is instructed to prepare, for a specified geographic region, gasoline that conforms to one of the grades set forth in the table of FIG. 2, the program 21 will extract from the regulatory information stored at 46 the regulatory requirements for that grade in the particular region of interest. Then, in block 102, the program 41 will determine appropriate adjusted specifications for fuel volatility characteristics. In other words, the program 41 will take the relevant government regulatory requirements and will make appropriate adjustments in order to come up with specifications for a gasoline that will meet the regulatory requirements either with or without ethanol, for example in a manner similar to that discussed above in association with the table of FIG. 2.

Next, in block 103, the program 41 will take the specifications developed in block 102, and will determine a selection of fuel components from the tanks 11-14 (FIG. 1), along with appropriate proportions for the selected components, so as to yield a gasoline meeting all relevant specifications. Then, in block 104, the program 41 will cause the control unit 31 to supply control signals at 32 to the fuel blending mechanism 21, so that the fuel blending mechanism 21 will extract and blend appropriate quantities of fuel components from the tanks 11-14. In a manner known in the art, the blending process may optionally be somewhat iterative. That is, the control unit 31 may output control signals 32 that cause the fuel blending mechanism 21 to prepare an initial blend, sample the initial blend, and then provide the control unit 31 with feedback at 33 regarding the volatility characteristics of the initial blend. The control unit 31 can then selectively add additional quantities of selected fuel components from the tanks 11-14, in order to fine tune the mixture and its volatility characteristics. When the mixture is finally determined to be suitable, and to meet all relevant specifications, the mixture can be supplied to the tank 24 to serve as the desired gasoline product.

As discussed above, the gasoline provided to tank 24 can be sold by itself, or can be mixed with up to 10% ethanol by volume, and in either case will meet all relevant regulatory requirements. As a result, the distribution of this gasoline from refineries to and through distribution terminals will involve the transportation, handling and storage of only a single grade of gasoline, rather than two separate grades of gasoline. This is beneficial in servicing a market that has demand for both an ethanol-free gasoline and a gasoline-ethanol blend, especially when volatility limits specified by regulation for the finished gasoline at retail sites are the same regardless of whether the fuel is ethanol free or contains ethanol. Gasoline terminals can provide either an ethanol-free gasoline or a gasoline-ethanol blend, each of which is based on the same specifically-designed, ethanol- free gasoline product. In the event of an ethanol supply shortage at the distribution terminal, the distribution terminal can continue to sell all gasoline on hand as ethanol-free gasoline, rather than ending up with a large quantity of a special gasoline that can only be sold as a gasoline-ethanol mixture, and that therefore cannot be sold until ethanol is again available.

Gasoline from the tank 24 can be delivered to markets that use ethanol blending and also markets that do not use ethanol blending, using the same distribution system of pipelines, barges and terminals. If the supply of this gasoline happens to exceed demand in markets for gasoline-ethanol blends, the excess volume of ethanol-free gasoline may be redirected to markets for ethanol-free gasoline. In other words, the ethanol-free gasoline disclosed herein is a more fungible product for trades between distribution terminals, because it is a commercially-marketable gasoline on its own, and ethanol-free distribution terminals can therefore accept and use it.

A terminal can also use this gasoline product (specifically designed to meet state volatility specifications with or without ethanol) to transition the terminal completely from selling only ethanol-free gasoline to selling gasoline either with or without ethanol, without any disruption in sales. More specifically, a gasoline terminal historically selling only ethanol-free gasoline will normally carry an inventory that includes only gasoline meeting state volatility specifications without ethanol. To make the transition to sales of gasoline containing ethanol, the terminal can receive multiple successive deliveries of the new gasoline product (specifically designed to meet state volatility specifications with or without ethanol), in order to progressively turn over the terminal tank inventory. During this inventory transition period, sales of ethanol-free gasoline can continue. When the transition is complete, the terminal can then begin selling and distributing the gasoline in the tanks either with or without ethanol, still without any disruption in sales activity.

As discussed above, the disclosed embodiment uses the computer program 41 in the control unit 31 to carry out the determination of specifications for fuel volatility characteristics (block 102 in FIG. 4). Alternatively, however, it would be possible to carry out this determination manually, rather than in a computer.

Although a selected embodiment has been illustrated and described in detail, it should be understood that a variety of substitutions and alterations are possible without departing from the spirit and scope of the present invention, as defined by the claims that follow.

What is claimed is:

1. A method comprising:

determining a specification for a fuel volatility characteristic, such that a fuel complying with the specification will itself meet an applicable regulatory requirement for the volatility characteristic, and such that a mixture of the fuel with a specified percentage of ethanol will meet an applicable regulatory requirement for the volatility characteristic; and utilizing a fuel blending mechanism to blend a plurality of different fuel components in a manner so that the blend of components meets the specification for the volatility characteristic.

2. An apparatus comprising:

a fuel blending mechanism;

means responsive to regulatory information regarding fuel volatility for determining a specification for a fuel volatility characteristic, such that a fuel complying with the specification will itself meet an applicable regulatory requirement for the volatility characteristic, and such that a mixture of the fuel with a specified percentage of ethanol will meet an applicable regulatory requirement for the volatility characteristic;

means for determining a blend of a plurality of different fuel components that will meet the specification for the volatility characteristic; and means for using the fuel blending mechanism to prepare the blend of fuel components.

3. An apparatus comprising a computer-readable medium storing a computer program that, when executed, determines a specification for a fuel volatility characteristic, such that a fuel complying with the specification will itself meet an applicable regulatory requirement for the volatility characteristic, and such that a mixture of the fuel with a specified percentage of ethanol will meet an applicable regulatory requirement for the volatility characteristic.

4. An apparatus according to claim 3, including a fuel blending mechanism, and wherein the computer program, when executed, causes the fuel blending mechanism to blend a plurality of different fuel components in a manner so that the blend of components meets the specification for the volatility characteristic.

* * * * *